United States Patent [19]

Hurlbut

[11] Patent Number: 4,833,320

[45] Date of Patent: May 23, 1989

[54] HIGH-TEMPERATURE WELL LOGGING INSTRUMENT WITH PLASTIC SCINTILLATION ELEMENT

[75] Inventor: Charles R. Hurlbut, Munson, Ohio
[73] Assignee: Bicron Corporation, Newbury, Ohio
[21] Appl. No.: 163,516
[22] Filed: Mar. 2, 1988
[51] Int. Cl.⁴ .............................................. G01V 5/04
[52] U.S. Cl. ................................. 250/256; 250/361 R
[58] Field of Search .............. 250/256, 361 R, 363 R, 250/368, 390 J

[56] References Cited

U.S. PATENT DOCUMENTS

| | | | |
|---|---|---|---|
| 2,902,603 | 9/1959 | Ferre | 250/368 |
| 3,073,954 | 1/1963 | Carlson et al. | 250/368 |
| 4,004,151 | 1/1977 | Novak | 250/485.1 |
| 4,158,773 | 6/1979 | Novak | 250/361 R |
| 4,360,733 | 11/1982 | Novak et al. | 250/361 R |
| 4,629,888 | 12/1986 | Wolk | 250/256 |
| 4,647,781 | 3/1987 | Takagi et al. | 250/483.1 |

Primary Examiner—Janice A. Howell
Assistant Examiner—Constantine Hannaher
Attorney, Agent, or Firm—Pearne, Gordon, McCoy & Granger

[57] ABSTRACT

A high-temperature well logging instrument of the scintillation detector type includes a plastic scintillation element susceptible to softening and deformation at high operating temperatures. To maintain the shape of the scintillation element at such high temperatures, a metal retaining cup holds the scintillation element in its original shape. The retaining cup with the scintillation element inside is capped at its open end by a silicon rubber pad that is transparent to photons generated by the scintillation element in response to detected radiation. A biasing spring holds the end face of a photomultiplier tube against the silicon rubber pad so as to sandwich the pad between the photomultiplier tube and the open end of the metal retaining cup. Such a configuration maintains excellent optical coupling between the scintillation element and photomultiplier tube during high-temperature well logging.

9 Claims, 1 Drawing Sheet

HIGH-TEMPERATURE WELL LOGGING INSTRUMENT WITH PLASTIC SCINTILLATION ELEMENT

BACKGROUND OF THE INVENTION

The present invention relates in general to well logging instruments of the scintillation detector type, and more particularly to the use of plastic scintillation elements for high-temperature well logging.

Well logging instruments incorporating scintillation elements are well known in the art. U.S. Pats. Nos. 4,004,151; 4,158,773; and 4,360,733, owned by the assignee of the present invention and incorporated herein by reference in their entireties, illustrate such instruments as including an inorganic crystal scintillation element composed of an alkali metal halide. For example, high purity thallium activated sodium iodide crystals have been used successfully as scintillation elements in high-temperature deep well logging applications. Such crystal scintillation elements are inherently mechanically resistant to the high temperatures (150° C.-200° C.) of deep well logging, and do not soften and deform, or otherwise structurally fail, as a sole result of such temperatures.

While many well logging applications utilize crystal scintillation elements, some applications could benefit from the use of organic, noncrystalline, amorphous scintillation elements, such as plastic scintillation elements, due to their high shock resistance and generally lower cost as compared to crystal scintillation elements. For example, polystyrenebased plastic scintillators sold by the assignee of the present invention under the trade designations BC-434 and BC-438 could be utilized.

The immediate problem presented by the use of such plastic scintillation elements in high-temperature well logging is their low-temperature resistance as compared to the earlier-noted inorganic crystals. Plastic scintillators, when subjected to temperatures in excess of for example 100° C., can soften and deform so as to lose their shape, resulting in failure of the scintillation element. Also, due to the softening and deformation problem, it becomes more difficult to provide and maintain efficient optical coupling between the plastic scintillation element and an associated photomultiplier tube.

It is a goal of the present invention to provide a highly reliable, high-temperature, deep well logging instrument incorporating a plastic scintillation element susceptible to softening and deformation at the operating temperatures of the instrument.

SUMMARY OF THE INVENTION

In accordance with the present invention, a housing member contains a photomultiplier tube having an end face for receiving photons to be detected. A scintillation element susceptible to softening and deformation at high operating temperatures of the instrument is positioned within the housing member in opposed relation to the end face of the photomultiplier tube wherein photons generated by the scintillation element in response to detected radiation are received by the photomultiplier tube via its end face. A cuplike retaining means contained within the housing member holds within it the scintillation element and maintains the original element's shape at said high operating temperatures.

Preferably, the retaining means is an openended, rigid metal cup completely filled by the plastic scintillation element. A transparent silicone rubber pad completely covers the open end of the cup. The end face of the photomultiplier tube is springbiased against the silicone rubber pad to sandwich it between the photomultiplier tube and the scintillation element.

Such a structure maintains the shape of the softened scintillation element at high operating temperatures while providing excellent optical coupling between the scintillation element and the photomultiplier tube.

BRIEF DESCRIPTION OF THE DRAWINGS

A fuller understanding of the invention may be had by referring to the following description and claims taken in conjunction with the accompanying drawing, wherein:

DETAILED DESCRIPTION OF THE PREFERRED EMBODIMENT

Figure 1:
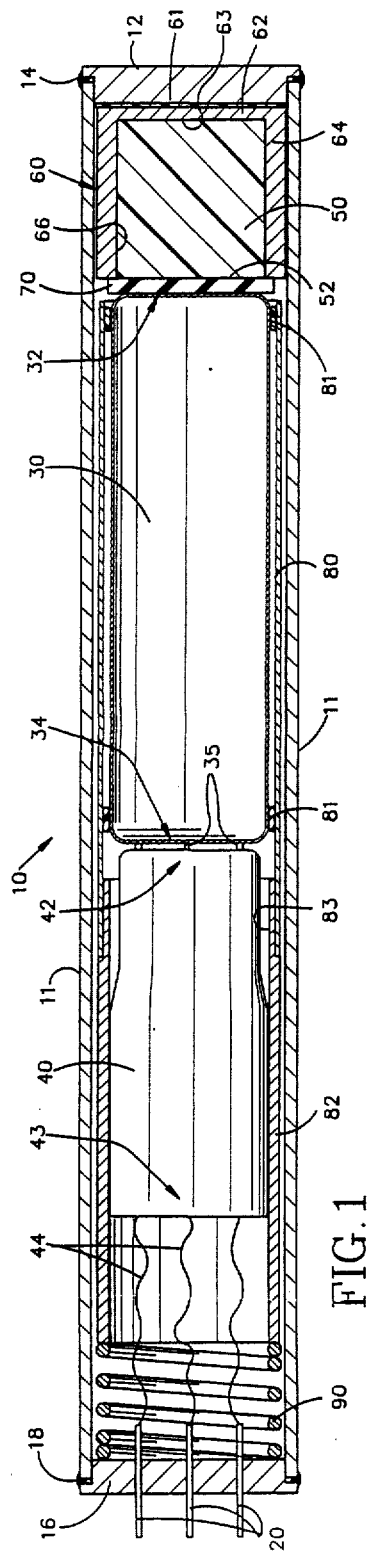
FIG. 1 is a longitudinal cross-sectional view of a well logging instrument incorporating a plastic scintillation element in accordance with the present invention.
Figure 2:
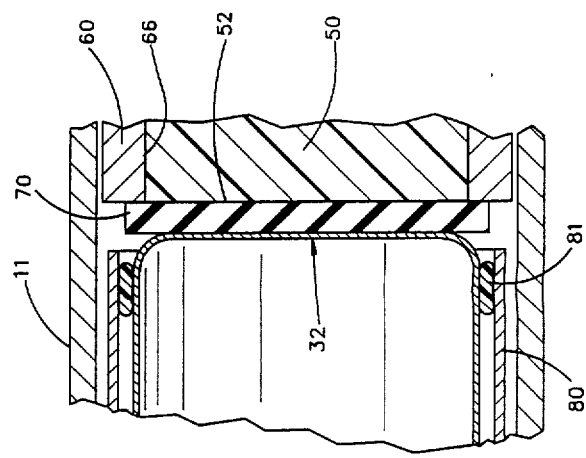
FIG. 2 is an enlarged, cross-sectional view of a portion of the well logging instrument illustrated in FIG. 1.

With reference to FIGS. 1 and 2 of the drawing, a deep well logging instruemnt 10 in accordance with the present invention is illustrated, such instrument being capable of operating at high temperature on the order of at least 150° C. to 200° C. The well logging instrument 10 includes a tubular housing member 11 formed from, for example, antimagnetic nickel-based steel to protect components contained within the member 11. The tubular housing member 11 takes the shape of an elongated, hollow cylinder having a forward or rightward end as viewed in FIG. 1, closed by a metal front end cap 12 which is disc-shaped and has a reduced diameter portion which plugs into or fits into the forward end of the housing member 11, as illustrated. The cap 12 is fixed to the forward end of the housing member 11 by an annular front weld bead 14. Such a structure seals the forward end of the housing member 11 from the outside atmosphere. In a similar fashion, the rearward or leftward end as viewed in FIG. 1 of the housing member 11 is closed by a metal rear end cap 16 which is disc-shaped and has a reduced diameter portion that plugs into or fits into the rear end of the tubular housing member 11, as illustrated. An annular rear weld bead 18 extends about the circumference of the interface area between the cap 16 and the rear end of the housing member 11, as illustrated, so as to seal the rearward end of the housing member from the outside atmosphere. Both end caps 12,16 are formed from a metal alloy compatible with the nickel-based steel forming the housing member 11 so as to permit the formation of the annular weld beads 14 and 18.

Projecting through the rear end cap 16 as illustrated are a plurality of metal connector pins 20 constituting electrical leads for providing power to internal components of the well logging instrument 10, and for receiving signals generated by the instrument in response to detected radiation. The connector pins 20 pass through the end cap 16 in an airtight hermetic fashion, preferably by the use of appropriate glass-to-metal seal structures, so as to maintain the air-tight integrity of the housing member 11 having its ends sealed by the welded caps 12, 16, as discussed above.

Contained and mounted within the housing member 11 is an elongated, cylinder-shpaed photomultiplier tube 30 of a conventional type having a glass envelope defining a front end face 32 and a rear end 34 from which extend pins 35 for electrically connecting internal components of the photomultiplier tube to a high temperature rated voltage divider 40 having a socket-like front end 42 for receiving the projecting pins 35 of the photomultiplier tube. A rear end 43 of the voltage divider 40 has extending from it a plurality of electrically conductive connecting wires or leads 44 that have their distal ends connected to the internal ends of the connector pins 20, as illustrated. The photomultiplier tube 30 is interconnected with the voltage divider 40 to provide a conventional component configuration known in the art which is powered in a conventioanl manner via leads 44 and pins 20. A suitable photomultiplier tube successfully used in practicing the present invention is known as a type R 1281 photomultiplier manufactured and sold by Hamamatsu Photonics K.K., of Hamamatsu City, Japan. A suitable voltage divider successfully used in practicing the present invention is similar to a type A 670 voltage divider manufactured and sold by Hamamatsu Corp.

In accordance with the present invention, a plastic scintillation element 50, which is susceptible to softening and deformation at high operating temperatures of the instrument 10, is contained within the housing member 11 and is positioned in opposed relation to the end face 32 of the photomultiplier tube 30. A scintillation element used successfully in practicing the present invention is composed of Type BC 438 plastic scintillation material manufactured and sold by the assignee of the present invention. The scintillation element 50 has a planar face 52 through which photons generated within the scintillation element 50 pass into photomultiplier tube 30 via its end face 32.

To maintain the shape of the plastic scintillation element 50, a retaining means in the form of a rigid metal retaining cup 60 holds within it the scintillation element 50, as illustrated. The retaining cup 60 includes a bottom end 62 and an annular side wall 64 having a highly polished interior surface 66 for reflecting photons impinging upon it. An interior surface 63 of the bottom end 62 is also highly polished to reflect photons. Thus, the total interior surface of the cup in its highly polished state reflects substantially all photons impinging upon it toward the open end of the cup, which is flush with the planar face 52 of the scintillation element 50, as illustrated, the element 50 completely filling the cup 60.

It can be seen that the photomultiplier tube 30, the voltage divider 40, and the scintillation element 50 are all generally cylindrical and coaxially lie along the longitudinal axis of the tublar housing member 11, as illustrated. It can also be seen that the end face 32 and the planar face 52 of the photomutiplier tube and the scintillation element 50 are parallel to each other, and lie in planes transverse to the longitudinal axis of the housing member 11.

Detailed mounting and assembly of the abovenoted major components of the well logging instrument 10 within the housing member 11 will now be discussed.

The scintillation element 50 is press-fitted into, and completely fills, the retaining cup 60, as illustrated, a layer of epoxy adhesive 61 bonding the bottom end 62 of the cup 60 to the inner surface of the front end cap 12. Thus, the cup 60 containing the scintillation element 50 is fixed in position within the housing in a permanent manner. To accommodate thermal expansion and contraction of the scintillation element 50, which is held in its original shape by the metal cup 60, a silicon rubber, circular elastomeric pad 70, which is transparent to photons, fits over and extends completely across the open end of the cup 60, as illustrated. The elastomeric pad 70 is held in its position by a compressive force applied against it by the photomultiplier tube end face 32, wherein the pad 70 is in effect sandwiched between the photomultiplier tube end face 32 and the planar face 52.

Such a biasing force is provided by mounting the photomultiplier tube 30 within a front tubular metal sleeve 80 by means of a pair of annular beads of adhesive 81 of, for example, a silicon rubber type. The rearward or left end (as viewed in FIG. 1) of the front tubular sleeve 80 fits over the front end of a rear tubular sleeve 82 having a reduced diameter 83. In effect, the front end of the rear tubular sleeve 82 plugs into and fits into the interior rearward end of the front tubular sleeve 80. The combination of the sleeves 80, 82 and the photomultiplier tube 30 constitutes a unitary assembly axially movable within the tubular housing 11. The voltage divider 40 plugs onto the rearward end 34 of the photomultiplier tube 30, the voltage divider 40 being slidably movable within the rearward tubular sleeve 82 so as to accommodate thermal expansion and contraction of the voltage divider 40.

A biasing force is applied to the rearward or leftward end of the rear tubular sleeve 82 by means of a biasing means constituted by a helical compression spring 90 which is compressed between the interior surface of the rear end cap 16 and the rear end of the sleeve 82, as illustrated. It can be seen that the compression spring 90 biases the tube 80, 82 toward the front or right end of the housing 11 so as to compress the elastomeric pad 70 between the scintillation element 50 and the end face 32 of the photomultiplier tube 30, as shown most clearly in FIG. 2. The pad 70 is formed by casting a type Sylgard 186 Rubber manufactured and sold by Dow Corning Corp. of Midland, Michigan.

Such a structure provides for highly reliable and efficient optical coupling between the scintillation element 50 and the photomultiplier tube 30. In particular, upon heating of the instrument 10 during a well logging cycle, thermal expansion and contraction of the elements contained therein, and in particular the scintillation element 50, are accommodated by the elasticity of the pad 70, and the compression spring 90 to a lesser extent. Thus, the metal cup 60 retains the plastic scintillation element within it even when in a softened condition due to high temperatures, while the elastomeric pad 70, functioning as the cap for the open end of the cup 60, has enough flexibility and compressibility to accommodate thermal expansion of the scintillation element 50. Also, the photomultiplier tube 30 is movable to a limited extent against the compression spring 90 so as to further accommodate thermal expansion of the scintillation element 50 and its cup 60.

In addition to the operational advantages discussed above, the assembly illustrated in FIGS. 1 and 2 also facilitates maintenace of the well logging instrument 10.

In assembling the instrument 10, the front end cap 12 is welded onto the forward end of the housing 11. The scintillation element 50 is then inserted into the cup 60 to the bottom end of which is applied the layer of epoxy adhesive 62. This subassembly of the scintillation element 50 and the cup 60, with the applied adhesive 62. is slid down the housing member 11 and pressed against the interior surface of the front end cap 12 to adhere the cup 60 into its position as illustrated in FIG. 1. The next step is to mount the photomultiplier tube 30 within the front tubular sleeve 80 by means of the pair of adhesive beads 81. When this subassembly is completed, the elastomeric pad 70 is positioned within the housing to completely cover the open end of the cup 60 and, in so doing, completely cover the planar face 52 of the scintillation element 50. Having properly positioned the elastomeric pad 70, the subassembly, constituted by the front tubular sleeve 80 with the photomultiplier tube fixed therein, is inserted into the open rearward end of the housing member 11 so that the end face 32 of the photomultiplier tube rests against the elastomeric pad 70.

The next step is to insert the voltage divider 40 into the housing 11 and push it onto the pins 35 of the multiplier tube. The rear tubular sleeve 82 is then slid over the voltage divider 40 and pushed into the rearward end of the front tubular sleeve 80 so as to connect the two sleeves 80, 82 together. The next step is to electrically connect the leads 44 to the interior ends of the pins 20 after the compression spring 90 has been inserted into its position against the rearward end of the rear tubular sleeve 82.

The final step in the process is to manually compress the spring 90 by inserting the cap 16 into the end of the housing 11 and to weld the end cap 16 to the housing 11 so as to provide the annular rear weld seam 18, as discussed earlier.

With the resulting structure, maintenance and repair of elements within the housing 11 can easily be provided. For example, should the photomultiplier tube 30 or the voltage divider 40 fail, the weld seam 18 can be opened and then the end cap 16 can be removed, releasing compression spring 90, which will then allow the voltage divider 40 and the rearward tubular sleeve 82 to be removed. Should it be desired, the photomultiplier tube 30 can also be removed with its sleeve 80. Finally, if need be, the elastomeric pad can be replaced with another. If it should be desired to replace the scintillation element 50, weld bead 14 can be removed and then the end cap 12, with the cup 60 adhered to it, can be pulled away from the housing 11, wherein the scintillation element 50 can be removed and a new one put in its place. The new subassembly can then be reinserted into proper position at the front end of the housing 11. It can be seen that the structure provided by the present invention can be easily assembled and disassembled, and will provide for the use of a plastic scintillation element in high-temperature deep well logging.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A high-temperature well logging instrument of the scintillation detector type, comprising:
a housing member;
a photomultiplier tube contained within the housing member, said tube having an end face for receiving photons to be detected;
a plastic scintillation element susceptible to softening and deformation at high operating temperatures of said instrument, said element being contained within the housing member and being positioned in opposed relation to said end face of the photomultiplier tube wherein photons generated by the scintillation element in response to detected radiation are received by the photomultiplier tube via its said end face; and
a cuplike retaining means contained within the housing member for holding the scintillation element and maintaining the element in its original shape at said high operating temperatures.

2. A well logging instrument according to claim 1, wherein said retaining means is an openended rigid cup having a bottom end, a side wall, and an open end in opposed relation to said end face of said photomultiplier tube, said scintillation element substantially completely filling said rigid cup.

3. A well logging instrument according to claim 1, wherein said photomultiplier tube is movable within said housing member, said retaining means holding said scintillation element being fixed in position within said housing, said instrument including a biasing means contained within said housing and applying a biasing force to said photomultiplier tube element to maintain it in position relative to said end face of said photomultiplier tube at said high operating temperatures.

4. A high-temperature well logging instrument of the scintillation detector type, comprising:
an elongated cylindrical housing member;
a cylindrical photomultiplier tube coaxially mounted in position within said housing member and movable relative thereto, said tube having a circular end face for receiving photons to be detected, said end face lying in a plane perpendicular to the longitudinal axis of said elongated housing member;
a plastic scintillation element contained within said housing member, said element being susceptible to softening and deformation at high operating temperatures of said instrument, said element having a planar face through which can pass photons generated within the scintillation element by detected radiation;
a rigid retaining cup and a photon transparent elastomeric pad, said cup having a bottom end, a side wall, and an open end, said cup being contained within the housing member and being fixed in position relative thereto at a point along the said longitudinal axis of the elongated housing member, said scintillation element being held within and substantially completely filling said cup wherein the cup maintains the element in its original shape at said high operating temperatures, said planar face of said scintillation element being flush with said open end of said cup, said open end being positioned opposite to said end face of said photomultiplier tube wherein said end face and said planar face are substantially parallel to each other, photons generated within said scintillation element being injected into said photomultiplier tube via said planar face and said end face; and
biasing means for maintaining said open end of the retaining cup in position relative to the end face of the movable photomultiplier tube over the operating temperature range of said well logging instrument, said elastomeric pad being sandwiched between said open end of the retaining cup and said end face.

5. A well logging instrument according to claim 4, wherein said biasing means forces said end face against said pad, said pad being compressed between said end face and said planar face.

6. A well logging detector according to claim 5, wherein said pad completely covers and caps the open end of the retaining cup to seal the scintillation element within the cup.

7. A well logging instrument according to claim 4, wherein the interior surface of said cup is polished to reflect photons generated within said scintillation element.

8. A well logging instrument according to claim 4, wherein said rigid retaining cup is metal.

9. A well logging instrument according to claim 4, wherein the biasing means is a spring located between the housing and the movable photomultiplier tube.

* * * * *

UNITED STATES PATENT AND TRADEMARK OFFICE
CERTIFICATE OF CORRECTION

PATENT NO. : 4,833,320

DATED : May 23, 1989

INVENTOR(S) : Charles R. Hurlbut

It is certified that error appears in the above-identified patent and that said Letters Patent is hereby corrected as shown below:

Column 1, line 32, delete "polystyrenebased" and insert --polystyrene-based--.

Column 1, line 67, delete "openended" and insert --open-ended--.

Column 2, line 3, delete "springbiased" and insert --spring-biased--.

Column 2, line 11, delete "Drawings" and insert --Drawing--.

Column 2, line 28, delete, "temperature" and insert --temperatures--.

Column 3, line 54, after"tube" insert --30--.

Column 6, line 18, delete "openended" and insert --open-ended--.

Signed and Sealed this

Twenty-seventh Day of February, 1990

Attest:

JEFFREY M. SAMUELS

Attesting Officer     Acting Commissioner of Patents and Trademarks